(12) United States Patent
Aybay et al.

(10) Patent No.: US 8,149,730 B1
(45) Date of Patent: Apr. 3, 2012

(54) METHODS AND APPARATUS RELATED TO PACKET GENERATION AND ANALYSIS

(75) Inventors: Gunes Aybay, Los Altos, CA (US); Cliff Deguzman, Dublin, CA (US); Srinivas Gadgil, Cupertino, CA (US); Paras Trivedi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 107 days.

(21) Appl. No.: 12/464,325

(22) Filed: May 12, 2009

(51) Int. Cl.
*H04L 12/26* (2006.01)
(52) U.S. Cl. ........................................ 370/253; 370/389
(58) Field of Classification Search .................. 370/241, 370/242–246, 248, 252, 351, 386–390
See application file for complete search history.

(56) References Cited

U.S. PATENT DOCUMENTS

| | | | |
|---|---|---|---|
| 6,075,773 A | 6/2000 | Clark et al. | |
| 6,654,923 B1 | 11/2003 | Grenier et al. | |
| 6,795,402 B1 | 9/2004 | Richardson et al. | |
| 7,100,091 B2* | 8/2006 | Nakamoto et al. | 714/43 |
| 7,184,408 B2 | 2/2007 | Denton et al. | |
| 7,222,255 B1 | 5/2007 | Claessens et al. | |
| 7,315,963 B2 | 1/2008 | Luciani et al. | |
| 7,356,077 B2 | 4/2008 | Fala et al. | |
| 7,391,736 B2 | 6/2008 | Na et al. | |
| 7,412,034 B2 | 8/2008 | Rancu et al. | |
| 7,489,641 B2 | 2/2009 | Miller et al. | |
| 7,826,381 B1* | 11/2010 | Kastuar et al. | 370/242 |
| 2002/0016708 A1* | 2/2002 | Houh | 703/26 |
| 2002/0059545 A1 | 5/2002 | Nakashima et al. | |
| 2002/0116675 A1 | 8/2002 | Gangl et al. | |
| 2003/0156548 A1* | 8/2003 | Sapp | 370/252 |
| 2003/0223376 A1 | 12/2003 | Elliott et al. | |
| 2006/0262728 A1 | 11/2006 | Addeo et al. | |
| 2008/0052015 A1 | 2/2008 | Ozawa et al. | |
| 2010/0061378 A1* | 3/2010 | Joyner et al. | 370/395.53 |
| 2010/0228842 A1 | 9/2010 | Kompella et al. | |

OTHER PUBLICATIONS

Spirent Communications, "Packet Generator and Analyzer Base Package," P/N 79-000028 Rev.E May 2007, ©2007 Spirent Communications, Inc., 8 pages.
Spirent Communications, Abacus™ 50 T1 and E1, "T1 and E1 Traffic Generator Test System," P/N 79-000122 Rev.E Nov. 2007, ©2007 Spirent Communications, Inc., 4 pages.
U.S. Appl. No. 12/493,742, filed Jun. 29, 2009, entitled "Methods and Apparatus Related to Analysis of Test Packets," 34 pages.
S. Amante et al. "Operations and Maintenance Next Generation Requirements" ©The IETF Trust (2008), 23 pages.
P. Pan et al. "Fast Reroute Extensions to RSVP-TE for LSP Tunnels" Standards Track, ©The Internet Society (2005), 39 pages.
Office Action mailed Mar. 24, 2011 for U.S. Appl. No. 12/493,742 (19 pages).
Office Action mailed Aug. 3, 2011 for U.S. Appl. No. 12/493,742 (20 pages).

* cited by examiner

*Primary Examiner* — Frank Duong
(74) *Attorney, Agent, or Firm* — Cooley LLP

(57) ABSTRACT

In one embodiment, an apparatus includes a packet generation module that has a set of general purpose processing modules and is configured to define a test packet configured to emulate at least a portion of network traffic. The apparatus also includes a switch device configured to receive the test packet from the packet generation module. The switch device is configured to multi-cast the test packet via a set of ports of the switch device to a target entity based on a routing policy.

23 Claims, 5 Drawing Sheets

METHODS AND APPARATUS RELATED TO PACKET GENERATION AND ANALYSIS

BACKGROUND

Embodiments described herein relate generally to equipment for testing a network, and, in particular, to methods and apparatus related to packet generation and analysis.

As networks have increased in size, complexity, and processing speed, assessing the capabilities of these networks using known testing platforms may not always be feasible. For example, many known testing platforms lack the port density to adequately test relatively large data center networks that can have hundreds of gigabit Ethernet ports. Some known scalable testing platforms that can be configured to test such large data center networks can consume undesirable levels of energy, can be prohibitively expensive, and/or can lack the flexibility desired to adequately test the data center networks.

Thus, a need exists for methods and apparatus related to packet generation and analysis configured to address the shortfalls of existing testing platforms.

SUMMARY

In one embodiment, an apparatus includes a packet generation module that has a set of general purpose processing modules and is configured to define a test packet configured to emulate at least a portion of network traffic. The apparatus also includes a switch device configured to receive the test packet from the packet generation module. The switch device is configured to multi-cast the test packet via a set of ports of the switch device to a target entity based on a routing policy.

DETAILED DESCRIPTION

Figure 1:
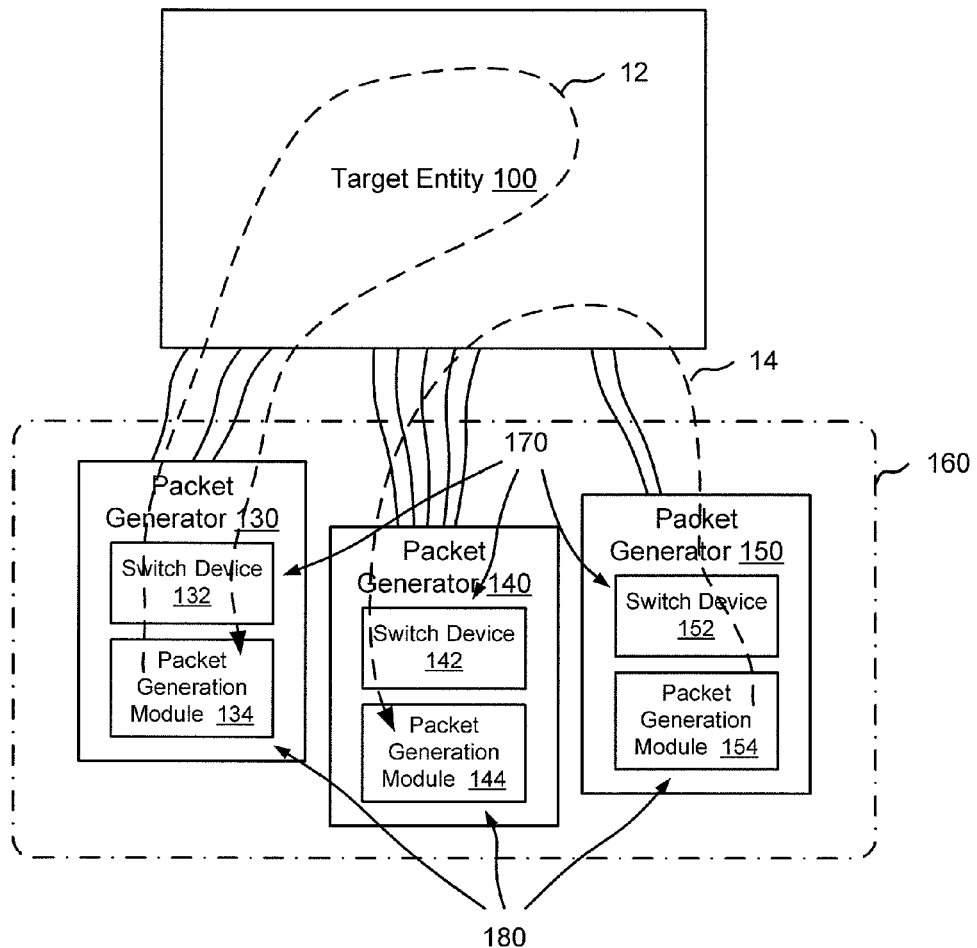
FIG. 1 is a schematic diagram that illustrates packet generators in communication with a target entity, according to an embodiment.

FIG. 1 is a schematic diagram that illustrates packet generators 160 in communication with a target entity 100, according to an embodiment. The packet generators 160 can be configured to define and/or send test packets to the target entity 100. In addition, the packet generators 160 can be configured to receive and/or analyze (or trigger analysis of) the test packets after the test packets have been processed at the target entity 100. The processing capabilities of the target entity 100 can be determined (e.g., assessed) based on an analysis of the test packets after the test packets have been processed at the target entity 100. Accordingly, the packet generators 160 are configured to define, send, receive, and/or analyze (or trigger analysis of) test packets that can be used to calculate one or more test parameter values related to a processing capability of the target entity 100. For example, test packets can be defined and sent to the target entity 100 to determine the processing speed of the target entity 100, the processing capacity of the target entity 100, the processing behavior of the target entity 100 with respect to a profile of test packets (e.g., a burst of test packets, a group of test packets emulating a particular type of network traffic), and/or so forth.

The target entity 100 is referred to as a target entity because it is a target of testing performed by the packet generators 160. In some embodiments, the scale of target entity 100 can vary from a single network switch to an entire network that can consist of multiple switches, routers, and/or service layer devices. In some embodiments, the test packets (e.g., a group of test packets) can be referred to as test traffic or as test network traffic. The test packets can be configured to emulate actual network traffic (e.g., a burst of packets, a denial of service attack) that could be defined by, for example, a server device (e.g., a host device), a data storage device, a router, and/or so forth. In some embodiments, packet generators (such as those shown in FIG. 1) can be configured to collectively produce, send (to a target entity), receive (from a target entity), and/or analyze, for example, several terabits per second of test network traffic.

The packet generators 160 include packet generator 130, packet generator 140, and packet generator 150. In some embodiments, the packet generators 160 can include more or less packet generators than those shown in FIG. 1. As shown in FIG. 1, each of the packet generators 160 has a switch device 170 and a packet generation module 180. For example, packet generator 130 includes switch device 132 and packet generation module 134. One or more of the packet generation modules 180 can be configured to define test packets that can be used to determine a processing capability of the target entity 100. The switch device 132 can be configured to manage the transmission and analysis of the test packets. For example, as illustrated by path 12 in FIG. 1, a test packet defined at packet generation module 134 can be received at the switch device 132 and forwarded to the target entity 100. After processing at the target entity 100, the test packet can be received by the switch device 132 and forwarded to the packet generation module 134 for analysis. As illustrated by path 22 in FIG. 1, a test packet defined at packet generation module 144 can be received at the switch device 142 and forwarded to the target entity 100. After processing at the target entity 100, the test packet can be received by the switch device 152 and forwarded to the packet generation module 154 for analysis.

One or more test packets defined by one or more of the packet generation modules 180 can include data (e.g., bit values) that can be used to analyze the processing capabilities of the target entity 100. For example, the test packets can be defined so that they include a portion that emulates a particular type of network traffic. In some embodiments, the test packets can be configured to emulate interne protocol (IP) network traffic. Accordingly, one or more of the test packets can have a header, a payload, and a trailer that is defined based on an IP protocol associated with any layer of the open systems interconnection (OSI) model. For example, one or more of the test packets defined by the packet generation modules 180 can be related to stateful, application layer traffic (e.g., related to layer-5 of the OSI model). In some embodiments, one or more portions of test packets defined by the packet generation modules 180 can include randomly generated data portions (e.g., randomly generated data payloads) and/or can be addressed to specified entities (e.g., one of the packet generators 160, one of the packet generation modules 180). For example, in some embodiments, address values and/or payloads of test packets defined by the packet generation modules 180 can be defined based on variations of a pseudo-random number. The packet generation modules 180 can be configured to define the test packets so that each of the test packets is unique (e.g., has a unique signature or unique identifier) within a specified domain, and thus, can be tracked by the packet generators 160.

In some embodiments, test parameter values related to processing of test packets at the target entity 100 can be determined based on signatures of the test packets. For example, a hash value can be calculated based on at least a portion of a test packet at the packet generation modules 180 and/or at the switch devices 170 so that test packet can be identified based on the hash value at a later time at the packet generation modules 180 and/or the switch devices 170.

In some embodiments, the packet generation modules 180 can be configured to define test packets at wire-speeds (also can be referred to as line rates). For example, packet generation module 144 can be configured to define and send a stream of test packets at substantially 10 Gigabits (Gb)/second (s) to a 10 Gb/s port of switch device 142. In some embodiments, the packet generation module 144 can be configured to define and send a stream of test packets at wire-speeds less than 10 Gb/s and at wire-speeds greater than 10 Gb/s.

In some embodiments, one or more of the packet generation modules 180 can include a general purpose processing component (not shown in FIG. 1) such as a general purpose central processing unit (CPU) configured to define test packets. In some embodiments, the packet generation modules 180 can include a general purpose memory component (e.g., a static random-access memory (SRAM)) that can be accessed by the general purpose processing component. In some embodiments, for example, one or more of the packet generation modules 180 can include a multi-core processing system. Although not shown, in some embodiments, one or more of the packet generators 180 can include more than one packet generation module and/or more than one switch device.

Figure 2:
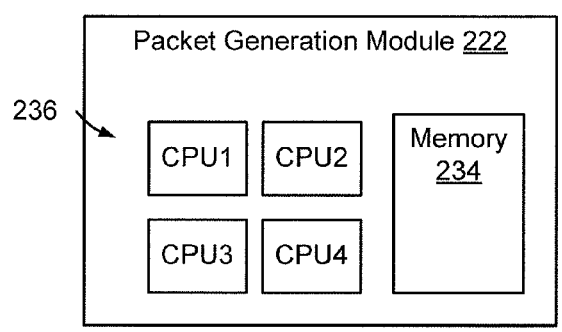
FIG. 2 is a schematic diagram of a packet generation module, according to an embodiment.

FIG. 2 is a schematic diagram of a packet generation module 222, according to an embodiment. The packet generation module 222 shown in FIG. 2 includes 4 general purpose CPUs—CPU1, CPU2, CPU3, and CPU4—and a memory 234. The CPUs can collectively be referred to as a general purpose processing system 236. Because the packet generation module 222 includes a general purpose processing system 236, the packet generation module 222 can be programmed to define various types of test packets at various rates in a dynamic fashion. For example, the general purpose processing system 236 can be programmed to define test traffic that emulates traffic from a specific, proprietary server application.

Referring back to FIG. 1, one or more of the switch devices 170 can be, for example, a general purpose routing device configured to distribute test packets to the target entity 100. In other words, the switch devices 170 included in the packet generators 160 can be off-the-shelf routing devices that can be included in a 1U space within a rack (e.g., a chassis). The switch device 152 can be, for example, a 24×10 G Ethernet switch that has a relatively small scale switch fabric. In some embodiments, the switch devices 170 can have processing modules (not shown) configured to distribute (e.g., forward, route) test packets received from the packet generation modules 180 to the target entity 100 based on one or more policies (e.g., a routing policy, a forwarding policy, an action control list (ACL) policy). In some embodiments, the switch devices 170 can be configured to modify one or more of test packets before and/or after the test packet(s) have been processed at the target entity 100. In some embodiments, the switch devices 170 can be configured to analyze one or more test packets at the switch devices 170 and/or send the test packets to another device such as one or more of the packet generation modules 180 for analysis.

As shown in FIG. 1, each of the packet generators 170 is operably coupled to target entity 100 via more than one connection (e.g., physical connection, wireless connection). Accordingly, each of the packet generators 170 can be configured to send (e.g., stream) test packets to the target entity 100 via their respective multiple connections. In some embodiments, the switch device 170 can be configured to multi-cast test packets defined by the packet generation modules 180 to the target entity 100. Although not shown, in some embodiments, one or more of the packet generators 160 can include more than one switch device. More details related to the functions of a packet generation module and a switch device within a packet generator are described in connection with FIGS. 2 through 6.

The target entity 100 can be any type of entity configured to receive and process test packets. In one embodiment, the target entity 100 can be, for example, a distributed switch/router based around a multi-stage switch fabric (e.g., 3-stage switch fabric, 5-stage switch fabric). For example, although not shown, the switch fabric can include an ingress stage, a middle stage, and an egress stage. In some embodiments, the switch fabric can be a reconfigurably (e.g., a re-arrangeably) non-blocking switch fabric and/or a time-division multiplexed switch fabric. In some embodiments, the switch fabric can be included within a data center network (e.g., a core portion of a data center network). Specifically, the switch fabric can define a core portion of the data center network, which can include a network or interconnection of devices. In some embodiments, the switch fabric can be defined based on a Clos network architecture (e.g., a strict sense non-blocking Clos network, a Benes network) that forms the data plane for a distributed switch/router system that can be included in (or can define) the core of a data center network. In some embodiments, one or more peripheral processing devices (e.g., a compute node, a storage node, a service node and/or a router) and/or other network devices, which can be operatively coupled to the data center network, can be emulated by the packet generators 160. More details related to a switch fabric are set forth in co-pending U.S. patent application Ser. No. 12/414,825, filed Mar. 31, 2009, entitled, "Distributed Multi-Stage Switch Fabric," co-pending U.S. patent application Ser. No. 12/345,502, filed Dec. 29, 2008, entitled, "Methods and Apparatus Related to a Modular Switch Architecture," and co-pending U.S. patent application Ser. No. 12/345,500, filed Dec. 29, 2008, entitled, "System Architecture for a Scalable and Distributed Multi-Stage Switch Fabric," all of which are incorporated herein by reference in their entireties.

In some embodiments, one or more portions of the packet generators 160 can include a hardware-based module (e.g., a digital signal processor (DSP), a field programmable gate array (FPGA)) and/or a software-based module (e.g., a module of computer code, a set of processor-readable instructions that can be executed at a processor). In some embodiments, one or more of the functions associated with the packet generators 160 can be included in different modules and/or combined into one or more modules.

In some embodiments, one or more components of the packet generators 160 can be included in different physical units. For example, the switch device 132 of packet generator 130 and the packet generation module 134 of packet generator 130 can be included in different 1U units within a rack. In some embodiments, all components of the packet generators 160 can be included in a single physical unit. For example, the switch device 132 of packet generator 130 and the packet generation module 134 of packet generator 130 can be included in the same rack-mountable 1U unit.

Figure 3:
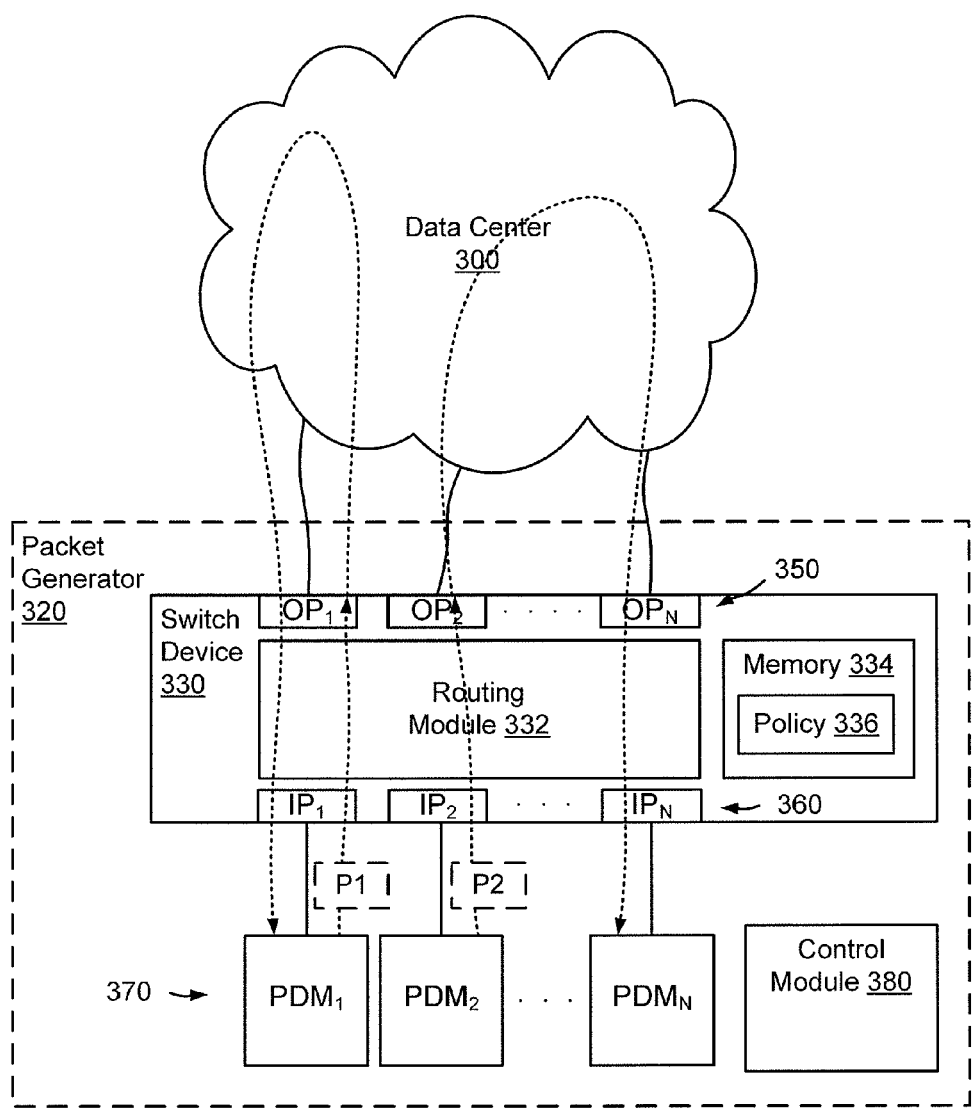
FIG. 3 is a schematic diagram that illustrates components of a packet generator in communication a data center, according to an embodiment.

FIG. 3 is a schematic diagram that illustrates components of a packet generator 320 in communication a data center 300, according to an embodiment. The packet generator 320 can be configured to define and/or send test packets to the data center 300. The packet generator 320 is also configured to receive and/or analyze the test packets after the test packets have been processed at the data center 300. The packet generator 320 includes a switch device 330 and packet generation modules $PDM_1$ through $PDM_N$ (collectively can be referred to as packet generation modules 370). Each of the packet generation modules 370 are operably coupled to the switch device 330 via ports $IP_1$ through $IP_N$ (collectively can be referred to as ports 360). The switch device 330 is operably coupled to the data center 300 via ports $OP_1$ through $OP_N$ (collectively can be referred to as ports 350). As shown in FIG. 3, the ports 350 are mutually exclusive from the ports 360.

As shown in FIG. 3, the switch device 330 has a routing module 332 configured to receive test packets defined by the packet generation modules 370 via the ports 360 (can also be referred to as input ports or as definition-side ports). The routing module 332 is configured to transmit (e.g., trigger transmission of) the test packets to the data center 300 via ports 350 (can also be referred to as output ports or as test-side ports).

The routing module 332 is also configured to process the test packets that are defined at the packet generation modules 370. The routing module 332 can be configured to process the test packets any time after the test packets are defined at the packet generation modules 370. The test packets can be processed at the routing module 332 before the test packets are received at the data center 300 and/or can be processed at the routing module 332 after the test packets are processed at the data center 300.

In this embodiment, the routing module 332 is configured to automatically forward any test packets received from the packet generation modules 370 at one or more of the ports 360 to one or more of the ports 350. Specifically, the routing module 332 can be configured to automatically forward packets from one of the ports 360 that is mapped to one of the ports 350. This type of mapping can be referred to as a forwarding map. For example, the packet generation module $PDM_1$ can be configured to define a test packet P1 and send the test packet P1 to port $IP_1$ of the switch device 330. In this embodiment, the test packet P1 can be forwarded by routing module 332 to port $OP_1$ without routing the test packet P1 because the port $OP_1$ is mapped to port $IP_1$ as a forwarding port as represented in a forwarding map. In other words, the test P1, can be forwarded without classifying the test packet based on, for example, information (e.g., a source address value, a destination address value) included in a header portion of the test packet P1. Similarly, test packet P2 can be forwarded from port $IP_2$ to port $OP_2$ in accordance within a forwarding map.

Although not shown, in some embodiments, a forwarding map including a mapping of one or more of the ports 360 to one or more of the ports 350 can be stored in memory 334. The mapping can be accessed from the memory 334 by the routing module 332. In some embodiments, each of the ports 360 can be mapped to one of the ports 350 as a forwarding port. Moreover, the forwarding map can be defined so that test packets defined by each packet generation module 370 will be automatically forwarded through the switch device 330 to the data center 300. In some embodiments, forwarding can be performed based on a forwarding map and/or an ACL included in a policy 336 stored in memory 334.

In some embodiments, multiple of the ports 360 can be mapped to one of the ports 350 as a forwarding port. This makes it possible to generate traffic from one or more of the ports 350 at a rate higher than the maximum traffic rate that can be generated by a single packet generation module 370. Moreover, the forwarding map can be defined so that test packets defined by a group of the packet generation modules 370 will be automatically forwarded through the routing module 332 to one or more of the ports 350 (which can function as an egress port(s)). For example, the routing module 332 can be utilized as (e.g., can be configured to function as) one or more multiplexers that concentrate the traffic generated by a set of the packet generation modules 370 via a set of ports 360 (which are functioning as ingress ports) to a set of ports 350 (which are functioning as egress ports). In this context, a number of the set of ports 360 may be greater than a number of the set of ports 350. In some embodiments, the traffic can be concentrated to just one of the ports 350. In some embodiments, a ratio of a number of a set of ports 360 and a number of a set of ports 350 (through which the routing module 332 may be configured to communicate) may be less than, equal to, or greater than one.

In some embodiments, a forwarding map for test packets transmitted in an egress direction from the packet generation modules 370 (through the switch device 330 towards the data center 300) can be different than a forwarding map for test packets transmitted in an ingress direction towards the packet generation modules 370 (from the data center 300 through the switch device 330 towards the packet generation modules 370). Test packets transmitted in an egress direction can be referred to as outbound test packets and test packets transmitted in an ingress direction can be referred to as an inbound test packets.

Although not shown, in some embodiments, the routing module 332 can be configured to forward test packet P2 to multiple ports based on a forwarding map. For example, the routing module 332 can be configured automatically forward (without routing) any test packets received at port $IP_1$ to port $OP_1$ and port $OP_N$ based on a forwarding map.

In some embodiments, the routing module 332 can be configured to forward one or more test packets without modifying the test packet(s). For example, the routing module 332 can be configured to forward test packet P2 without modifying the test packet P2. In other words, the test packet P2 can be forwarded through the switch device 330 such that the switch device 330 behaves as a pass-through device. Accordingly, source address values and/or destination address values associated with the packet generation modules 370 will be virtually at the ports 350 (the test-side ports). In some embodiments, each of the packet generation modules 370 can have a unique address value (e.g., a media access control (MAC) address value, an IP address value).

In some embodiments, the routing module 332 can be configured to modify one or more of test packets before the test packets are forwarded through the switch device 330. For example, if test packet P2 is to be forwarded from port $IP_1$ to port $OP_1$ and port $OP_N$ based on a forwarding map, the routing module 332 can be configured to modify the test packet P2 so that a first copy of test packet P2 forwarded to port $OP_1$ has a different signature than a signature of a second copy of test packet P2 forwarded to port $OP_N$. In some embodiments, the signatures can be defined by identifiers included in copies of the test packet P2 and/or a particular pattern of bit values included in any portion of the copies of the test packet P2. In some embodiments, the routing module 332 can be configured modify at least a portion of a header (e.g., a destination address value, a source address value, a value in a type field), a payload (e.g., a bit value included in a payload), and/or a trailer (e.g., a checksum value) of a test packet before forwarding the test packet.

As shown in FIG. 3, after being processed at the data center 300, the test packet P2 is received at port $OP_N$ and forwarded by the routing module 332 to port $IP_N$ (e.g., forwarded based on a forwarding map). Also, the test packet P1 is received at port $OP_1$ and forwarded by the routing module 332 to port $IP_1$ (e.g., forwarded based on a forwarding map). The test packet P2 can be routed by the data center 300 to port $OP_N$ based on a destination address value included in the test packet P2. Similarly, the test packet P1 can be routed by the data center 300 to port $OP_1$ based on a destination address value included in the test packet P1. In some embodiments, the destination address value can correspond with an address value used to identify an interface associated with the ports 350 and/or one or more of the packet generation modules 370.

The packet generation modules 370 can be configured to calculate various test parameter values related to processing of test packet P1 and/or test packet P2 at the data center 300. For example, packet generation module $PDM_1$ can be configured to calculate a processing latency related to test packet P1 based on a transmit time and a receive time associated with the test packet P1. Although not shown, in some embodiments, the packet generation module $PDM_1$ can be configured to calculate a packet loss rate in response to test packet P1 not being received at the packet generation module $PDM_1$ within a specified time period.

In some embodiments, the switch device 330 can be configured to calculate various test parameter values related to processing of test packet P1 and/or test packet P2 at the data center 300. For example, the switch device 330 can be configured to count test packet P1 as a transmitted test packet when it is transmitted from the switch device 330. The switch device 330 can also be configured to count the test packet P1 as a received test packet when test packet P1 is received at the switch device 330 from the data center 300.

In some embodiments, the routing module 332 of the switch device 330 can be configured to modify one or more of test packets before the test packets are analyzed at the switch device 330 and/or the packet generation modules 370. For example, a group of test packets (e.g., egress test packets, ingress test packets) can be modified by the routing module 332 so that they include an identifier that can be used by the packet generation modules 370 during analysis. In some embodiments, a test parameter value (e.g., a statistical value) can be calculated based on the identifier.

In some embodiments, packets (e.g., test packets) received from the data center 300 at one or more of the ports 350 of the switch device 330 can be distributed to multiple packet generation modules 370. In this mode, the routing module 332 can be configured to function as a load balancer where traffic from one of the ports 350 can be distributed across multiple packet generation modules 370 via the ports 360. The load balancing decision can be based on, for example, the header fields and/or the signatures in one or more packets received by the routing module 332. This embodiment can enable the packet generator 320 to analyze traffic from very high speed ports (e.g., 100 Gigabit Ethernet ports) that can carry traffic at rates higher than any single (or group of) packet generation module 370 is capable of analyzing.

As shown in FIG. 3, a quantity of ports 350, a quantity of ports 360, and a quantity of packet generation modules 370 included in the packet generator 320 is the same (as represented by the subscript N). In some embodiments, the quantity of the ports 360, the quantity of the ports 360, and the quantity of the packet generation modules 370 can be equal to, for example, 12. In some embodiments, N can be less than 12 or greater than 12. In some embodiments, the packet generation modules 370 can be integrated into a physical unit that can be inserted into a 1U space of a rack, and the switch device 330 can be included in a 1U space of the rack. In some embodiments, the quantity of ports 350, the quantity of ports 360, and/or the quantity of packet generation modules 370 included in the packet generator 320 can be different. Although not shown, in some embodiments, one or more of the packet generation modules 370 can be operably coupled to more than one of the ports 360 of the switch device 330.

A control module 380 can be configured to store a test program that can be used to trigger testing by the packet generator 320. The packet generation modules 370 and/or the switch device 330 can be configured to define, send, and/or analyze test packets based on the test program. For example, the control module 380 can be configured to trigger the packet generation modules 370 to define test packets to emulate a particular type of test network traffic at the data center 300 based on a test program. In some embodiments, the control module 380 can be configured to trigger the routing module 332 to route the test packets to the packet generation modules 370 for analysis at the packet generation modules 370 in a particular pattern based on the test program.

Although the ports 350 of the switch device 330 and the ports 360 of the switch device 330 are shown on different physical sides of the switch device 330, the ports 350 of the switch device 330 and the ports 360 of the switch device 330 can be logically defined and do not preclude various physical configurations of the switch device 330. For example, one or more of the ports 350 and/or one or more of the ports 350 of the switch device 330 can be physically located at any side of the switch device 330.

Figure 4:
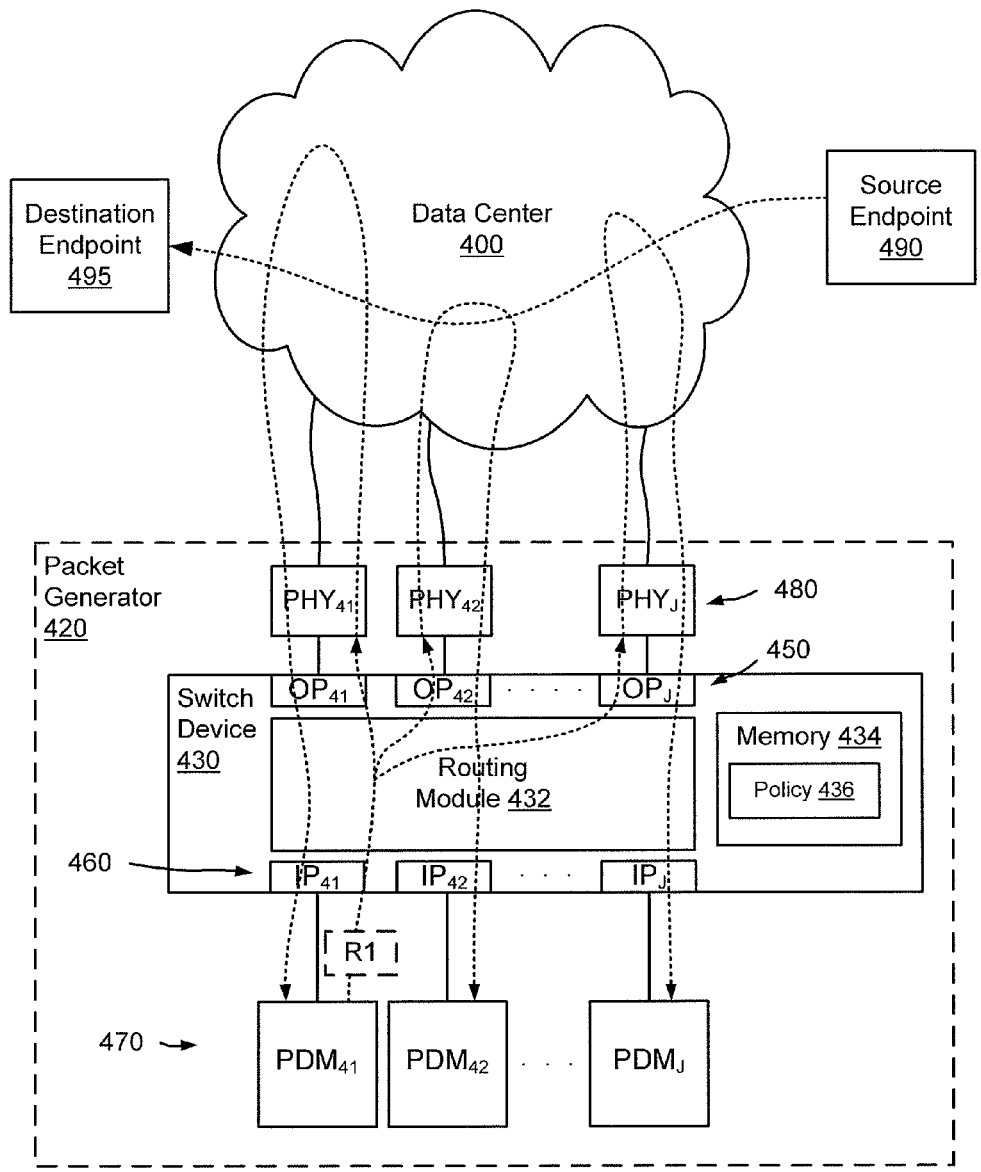
FIG. 4 is a schematic diagram that illustrates a packet generator configured to multi-cast a test packet to a data center, according to an embodiment.

FIG. 4 is a schematic diagram that illustrates a packet generator 420 configured to multi-cast a test packet R1 to a data center 400, according to an embodiment. The packet generator 420 can be configured to define and/or send test packets to the data center 400. The packet generator 420 is also configured to receive and/or analyze the test packets after the test packets have been processed at the data center 400. The packet generator 420 includes a switch device 430 and packet generation modules $PDM_{41}$ through $PDM_J$ (collectively can be referred to as packet generation modules 470). Each of the packet generation modules 470 are operably coupled to the switch device 430 via ports $IP_{41}$ through $IP_J$ (collectively can be referred to as ports 460). The switch device 430 is operably coupled to the data center 400 via ports $OP_{41}$ through $OP_J$ (collectively can be referred to as ports 450).

In this embodiment, the routing module 432 is configured to route a test packet defined at one or more of the packet generation modules 470 to the data center 400. For example, the routing module 432 can be configured to route one or more test packets to a specified portion of the data center 400 based on a classification of the test packet(s) (e.g., a routing classification based on a portion of the test packet(s)). The classification can be based on a policy 436 (e.g., a routing policy) stored in memory 434. In some embodiments, at least a portion of the policy 436 can be a routing policy stored in the memory 434.

In some embodiments, the routing module 432 can be configured to route a test packet through one or more of the ports 450 (e.g., a subset of the ports 450, all of the ports 450) to the data center 400. As shown in FIG. 4, the routing module 432 is configured to multi-cast the test packet R1 (e.g., copies of the test packet R1) to the data center 400 via port $OP_{41}$, port $OP_{42}$, and port $OP_J$ based on the policy 436. By multi-casting one or more test packets to the data center 400 based on the policy 436, the flow rate of test network traffic sent to the data center 400 can be multiplied. In this embodiment, the flow rate of test network traffic that would be generated by test packet R1, if only uni-cast to the data center 400, is multiplied three-fold through multi-casting. In some embodiments, the routing module 432 can be configured to broadcast one or more test packets through the ports 450 to the data center 400.

In some embodiments, the routing module 432 can be configured to modify one or more test packets being routed at the routing module 432 before transmitting the test packet(s) to the data center 400. For example, the routing module 432 can be configured to modify one or more bit values (e.g., bit values in a field, bit values of an address value, bit values of a payload) of test packets being routed at the routing module 432 before the test packet(s) are sent to the data center 400 from the switch device 430. In some embodiments, the routing module 432 can be configured to modify the test packet(s) based on at least a portion of the policy 436. For example, the routing module 432 can be configured to modify a destination address value included in each copy of the test packet R1 being multi-cast from the switch device 430.

As shown in FIG. 4, the switch device 430 is operably coupled to the data center 400 via physical-layer-interface devices $PHY_{41}$ through $PHY_J$ (collectively can be referred to as physical ports 480). The physical-layer-interface device 480 can be configured to convert a signal defined based on a first platform (e.g., protocol) into a signal defined based on a second platform (e.g., protocol) different than the first platform. The first platform can be associated with, for example, the switch device 430 and the second platform can be associated with the data center 400. For example, if the data center 400 is configured to process signals based on an fiber optic protocol (e.g., fiber channel protocol (FCP)) and the switch device 430 is configured to process signals based on an Ethernet protocol, the physical-layer-interface device 480 can be configured to convert a stream of bit values transmitted from the switch device 430 from the Ethernet protocol into an optical signal that can be processed by the data center 400.

As shown in FIG. 4, the routing module 432 is configured to forward the copies of the test packet R1 in the ingress direction that have been processed at the data center 400 to the packet generation modules 470 for processing. For example, the packet generation modules 470 can be configured to calculate one or more test parameter values related to the processing capabilities of data center 400 by analyzing the copies of the test packet R1 received at the packet generation modules 470.

As shown in FIG. 4, in some embodiments, stateful test traffic (or actual stateful traffic) can be sent from a source endpoint 490 (e.g., a server node device, a compute node device, a storage node device, a router) to a destination endpoint 495 (e.g., a server node device, a compute node device, a storage node device, a router) through the data center 400 while test network traffic is being sent to the data center 400 from the packet generator 420. In some embodiments, the test network traffic can function as background traffic to the stateful test traffic. The stateful test traffic can be, for example, higher layer traffic (e.g., layer-4 of the OSI model and above) and the background traffic can be lower layer routing traffic (e.g., layer-3 of the OSI model and below). One or more packet generation modules (or similar devices) can be used to analyze the capability of the data center 400 to process the stateful test traffic concurrently with the background traffic (by listening to and/or analyzing the stateful test traffic and/or the background traffic).

In some embodiments, background traffic can be sent from a source endpoint 490 (e.g., a server node device, a compute node device, a storage node device, a router) to a destination endpoint 495 (e.g., a server node device, a compute node device, a storage node device, a router) through the data center 400 while stateful test traffic is being sent to the data center 400 from the packet generator 420. In some embodiments, the test network traffic can function as background traffic to the stateful test traffic. One or more packet generation modules (or similar devices) can be used to analyze the capability of the data center 400 to process the stateful test traffic concurrently with the background traffic (by listening to and/or analyzing the stateful test traffic and/or the background traffic).

Figure 5:
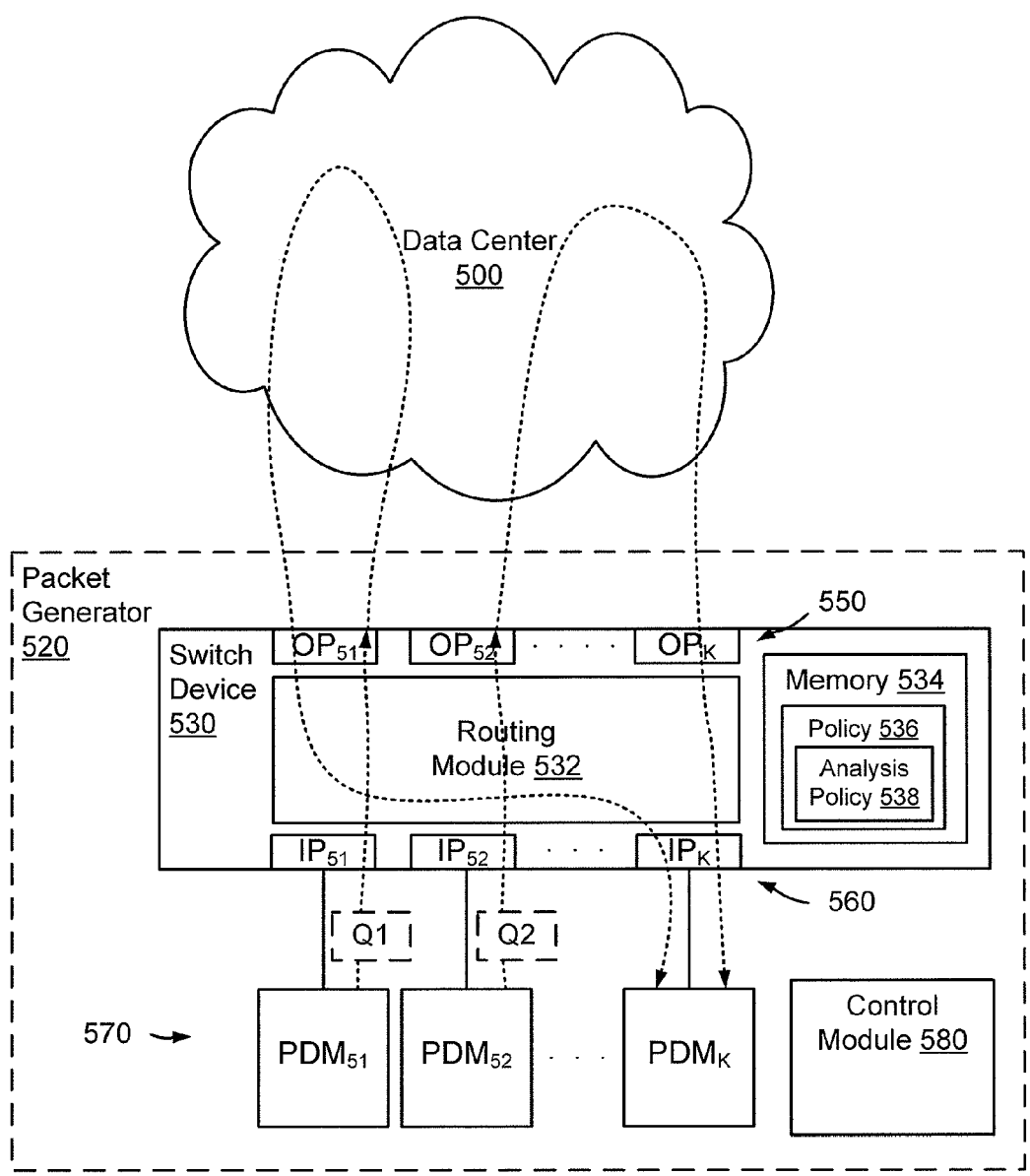
FIG. 5 is a schematic diagram that illustrates a packet generator configured to route test packets received from a data center based on an analysis policy, according to an embodiment.

FIG. 5 is a schematic diagram that illustrates a packet generator 520 configured to route test packets received from a data center 500 based on an analysis policy 538, according to an embodiment. As shown in FIG. 5, the analysis policy 538 is included in a policy 536 stored in a memory 534 at the switch device 530.

As shown in FIG. 5, the packet generator 520 can be configured to define and/or send test packets to the data center 500. The packet generator 520 is also configured to receive and/or analyze the test packets after the test packets have been processed at the data center 500. The packet generator 520 includes a switch device 530 and packet generation modules $PDM_{51}$ through $PDM_K$ (collectively can be referred to as packet generation modules 570). Each of the packet generation modules 570 are operably coupled to the switch device 530 via ports $IP_{51}$ through $IP_K$ (collectively can be referred to as ports 560). The switch device 530 is operably coupled to the data center 500 via ports $OP_{51}$ through $OP_K$ (collectively can be referred to as ports 550).

As shown in FIG. 5, the packet generation module $PDM_{51}$ is configured to define and send a test packet Q1 to port $IP_{51}$ of the switch device 530, and the packet generation module $PDM_{52}$ is configured to define and send a test packet Q2 to port $IP_{52}$ of the switch device 530. The switch device 530 is configured to forward the test packet Q1 and the test packet Q2 to the data center 500 via port $OP_{51}$ and port $OP_{52}$, respectively. After the test packet Q1 and the test packet Q2 have been processed at the data center 500, the data center 500 is configured to send the test packet Q1 and the test packet Q2 to port $OP_{51}$ and port $OP_K$, respectively.

The routing module 532 can be configured to route one or more test packets to one or more of the packet generation modules 570 for analysis at the packet generation module(s) 570 based on the analysis policy 538. In some embodiments, for example, the routing module 532 can be configured to route a test packet to one of the packet generation modules 570 for analysis when the packet generation module 570 has a processing load that is below an analysis threshold value included in the analysis policy 538. In some embodiments, the routing module 532 can be configured to route test packets to the packet generation modules 570 for processing so that an analysis processing load is distributed to the packet generation modules 570 in a desirable fashion (e.g., in a load-balanced fashion). In some embodiments, the routing module 532 can receive indicators of processing load at each of the packet generation modules 570 so that the routing module can determine whether or not one or more of the packet generation modules 570 would be available to process one or more test packets. In this embodiment, the routing module 532 is configured to route the test packet Q1 and the test packet Q2 to packet generation module $PDM_K$ for analysis at packet generation module $PDM_K$ based on the analysis policy 538. In some embodiments, the routing module 532 can be configured to route one or more test packets to one or more packet generation modules at a different packet generator (not shown).

In some embodiments, the routing module 532 can be configured to route a test packet to a packet generation module from the packet generation modules 570 that is not a destination of the test packet. For example, a test packet can have an destination address value (e.g., a MAC address value, an IP address value) associated with a first packet generation module from the packet generation modules 570. Rather than route the test packet to the first packet generation module, the routing module 532 can be configured to route the test packet to a second packet generation module from the packet generation modules 570 so that the test packet can be analyzed at the second packet generation module 570. In some embodiments, the routing module 532 can be configured to route the test packet to the second packet generation module 570 for analysis because the first packet generation module 570 has a processing load that exceeds an analysis threshold value included in the analysis policy 538.

Figure 6:
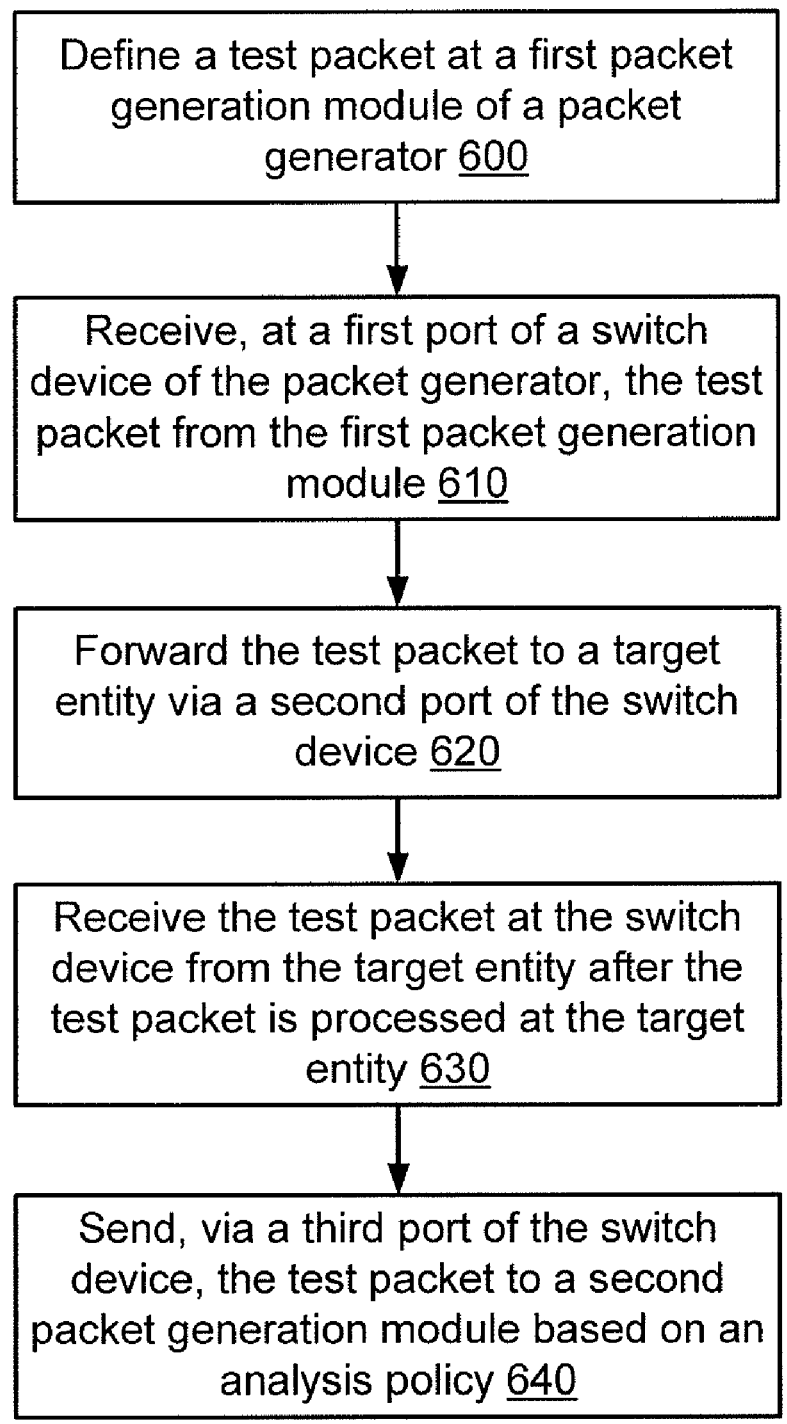
FIG. 6 is a flowchart that illustrates a method for processing a test packet at a packet generator, according to an embodiment.

FIG. 6 is a flowchart that illustrates a method for processing a test packet at a packet generator, according to an embodiment. As shown in FIG. 6, a test packet is defined at a first packet generation module of a packet generator, at 600. In some embodiments, the test packet can be defined based on test program. In some embodiments, the first packet generation module can be triggered to define the test packet in response to an instruction from a control module of the packet generator.

The test packet is received at a first port of a switch device of the packet generator from the first packet generation module, at 610. The first port of the switch device can be operably connected to the first packet generation module. The first port of the switch device can be configured to function as a definition-side port of the switch device.

The test packet is forwarded to a target entity via a second port of the switch device, at 620. The second port of the switch device can be operably connected to, for example, a port of the target entity. The second port of the switch device can be configured to function as a test-side port of the switch device. In some embodiments, the test packet can be forwarded based on a forwarding map included in a policy of the switch device.

The test packet can be received at the switch device from the target entity after the test packet is processed at the target entity, at 630. The test packet can be received via a port of the switch device functioning as a test-side port. The port can be a different port than the port described in connection with block 620.

The test packet is sent to a second packet generation module via a third port of the switch device based on an analysis policy, at 640. The test packet can be sent to the second packet generation module based on processing load threshold value, which is included in the analysis policy, being satisfied. In some embodiments, the third port can be a definition-side port.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, multiple switch devices can be included in a packet generator.

What is claimed is:

1. An apparatus, comprising:
a packet generation module having a set of general purpose processing modules and configured to define a test packet configured to emulate at least a portion of network traffic; and
a switch device configured to receive the test packet from the packet generation module, the switch device configured to multi-cast the test packet via a set of ports of the switch device to a target entity based on a routing policy.

2. The apparatus of claim 1, further comprising:
a set of packet generation modules operatively coupled to the switch device, the packet generation module is included in the set of packet generation modules, each packet generation module from the set of generation modules has an independent processor system and an independent memory bank.

3. The apparatus of claim 1, further comprising:
a set of packet generation modules operatively coupled to the switch device, the packet generation module is a first packet generation module from the set of packet generation modules, the switch device is configured to send the test packet to a second packet generation module from the set of packet generation modules based on an analysis policy.

4. The apparatus of claim 1, wherein the switch device is configured to receive the test packet from the target entity after the test packet has been multi-cast via the set of ports of the switch device,
the switch device is configured to route, after the test packet is received from the target entity, the test packet to a destination endpoint having a destination address value different than a destination address value included in the test packet such that the test packet is analyzed at the destination endpoint.

5. The apparatus of claim 4, wherein the packet generation module is operatively coupled to the switch device and is configured to emulate a first server, the apparatus further comprising:

a packet generation module configured to emulate a second server and operatively coupled to the switch device, the destination address value included in the test packet representing an interface of the packet generation module configured to emulate the second server; and a packet generation module configured to emulate a third server and operatively coupled to the switch device, the destination endpoint being the packet generation module configured to emulate the third server.

6. The apparatus of claim 1, wherein the switch device is configured to increment a counter based on an access control list and in response to receiving the test packet.

7. The apparatus of claim 1, wherein the target entity is a multi-stage switch fabric defining at least a portion of a data center core.

8. The apparatus of claim 1, wherein the target entity is a multi-stage switch fabric defined based on a Clos architecture.

9. The apparatus of claim 1, wherein each port from the set of the ports of the switch device is at least a 10 gigabit-per-second port.

10. An apparatus, comprising:

a set of packet generation modules configured to define a plurality of test packets emulating network traffic related to at least one of a plurality of server devices or a plurality of storage devices; and a switch device having a switch fabric operatively coupled to the set of packet generation modules via a first set of ports, the switch fabric of the switch device configured to be operatively coupled to a target entity via a second set of ports mutually exclusive from the first set of ports.

11. The apparatus of claim 10, wherein each packet generation module from the set of packet generation modules has a unique MAC address value.

12. The apparatus of claim 10, wherein the switch device is configured to forward a uni-cast test packet from the plurality of test packets via the switch fabric based on a mapping of each port from the first set of ports to a unique port from the second set of ports.

13. The apparatus of claim 10, wherein the first set of ports includes a quantity of ports equal to a quantity of ports included in the second set of ports.

14. The apparatus of claim 10, wherein each of the packet generation modules from the set of packet generation modules is configured to emulate network traffic at a wire-speed rate of at least 10 gigabits per second.

15. The apparatus of claim 10, wherein at least 4 packet generation modules are included in the set of packet generation modules, the first set of ports includes at least 4 ports and the second set of ports includes at least 4 ports, the set of packet generation modules are integrated into a 1U rack unit.

16. The apparatus of claim 10, wherein the network traffic is background network traffic.

17. A method, comprising:

receiving, at a first port of a switch device, a test packet from a packet generation module from a set of packet generation modules operatively coupled to the switch device;

forwarding the test packet to a target entity via a second port of the switch device mapped to the first port of the switch device;

receiving the test packet from the target entity after the test packet is processed at the target entity; and sending the test packet to a destination endpoint having a destination address value different than a destination address value included in the test packet such that the test packet is analyzed at the destination endpoint.

18. The method of claim 17, wherein the sending of the test packet to the destination endpoint is performed in response to a processing load at the packet generation module.

19. The method of claim 17, wherein the packet generation module is a first packet generation module, the destination endpoint is a second packet generation module from the set of packet generation modules, the sending includes sending via a third port of the switch device operatively coupled to the second packet generation module.

20. The method of claim 17, wherein the forwarding is performed without making a routing determination related to the test packet at the switch device.

21. The method of claim 17, further comprising:

routing a copy of the test packet to the target entity via a third port of the switch device based on a multi-cast instruction.

22. The method of claim 17, wherein the forwarding is performed such that an address value associated with the packet generation module is also associated with the second port as a virtual address value of the second port.

23. The method of claim 17, further comprising:

defining the test packet at the packet generation module such that the test packet emulates at least a portion of stateful network traffic related to the target entity.

\* \* \* \* \*

UNITED STATES PATENT AND TRADEMARK OFFICE
CERTIFICATE OF CORRECTION

| | | |
|---|---|---|
| PATENT NO. | : 8,149,730 B1 | Page 1 of 1 |
| APPLICATION NO. | : 12/464325 | |
| DATED | : April 3, 2012 | |
| INVENTOR(S) | : Gunes Aybay et al. | |

It is certified that error appears in the above-identified patent and that said Letters Patent is hereby corrected as shown below:

Column 12, line 50, after "of" insert --packet--.

Signed and Sealed this
Fifteenth Day of May, 2012

David J. Kappos
*Director of the United States Patent and Trademark Office*